(12) United States Patent
Yang et al.

(10) Patent No.: US 11,783,587 B2
(45) Date of Patent: Oct. 10, 2023

(54) DEEP LEARNING TATTOO MATCH SYSTEM BASED

(71) Applicant: NEC Laboratories America, Inc., Princeton, NJ (US)

(72) Inventors: Yi Yang, Princeton, NJ (US); Biplob Debnath, Princeton, NJ (US); Giuseppe Coviello, Princeton, NJ (US); Oliver Po, San Jose, CA (US); Srimat Chakradhar, Manalapan, NJ (US); Yang Gao, Dallas, TX (US)

(73) Assignee: NEC Corporation

( * ) Notice: Subject to any disclaimer, the term of this patent is extended or adjusted under 35 U.S.C. 154(b) by 345 days.

(21) Appl. No.: 17/188,194

(22) Filed: Mar. 1, 2021

(65) Prior Publication Data
US 2021/0279471 A1 Sep. 9, 2021

Related U.S. Application Data

(60) Provisional application No. 62/984,850, filed on Mar. 4, 2020.

(51) Int. Cl.
*G06V 20/52* (2022.01)
*G06N 3/08* (2023.01)
(Continued)

(52) U.S. Cl.
CPC ............ *G06V 20/52* (2022.01); *G06F 18/211* (2023.01); *G06F 18/214* (2023.01); *G06N 3/08* (2013.01); *G06V 20/41* (2022.01)

(58) Field of Classification Search
CPC ........ G06V 20/52; G06V 20/41; G06V 10/82; G06V 10/764; G06V 10/454; G06V 40/10; G06V 10/25; G06V 2201/09; G06V 10/457; G06V 20/00; G06V 20/582; G06V 30/274; G06V 10/255; G06V 10/462;
(Continued)

(56) References Cited

U.S. PATENT DOCUMENTS 9,298,997 B1 * 3/2016 Lecky .................. G06V 30/424
10,095,938 B2 * 10/2018 Lo .......................... G06T 5/003
(Continued)

OTHER PUBLICATIONS

Han et al., "Tattoo Based Identification: Sketch to Image Matching", 2013 International Conference on Biometrics (ICB). Jun. 4, 2013. pp. 1-8.
(Continued)

*Primary Examiner* — Michael S Osinski
(74) *Attorney, Agent, or Firm* — Joseph Kolodka

(57) ABSTRACT

A computer-implemented method executed by at least one processor for detecting tattoos on a human body is presented. The method includes inputting a plurality of images into a tattoo detector, selecting one or more images of the plurality of images including tattoos, extracting, via a feature extractor, tattoo feature vectors from the tattoos found in the one or more images of the plurality of images including tattoos, applying a deep learning tattoo matching model to determine potential matches between the tattoo feature vectors and preexisting tattoo images stored in a tattoo training database, and generating a similarity score between the tattoo feature vectors and one or more of the preexisting tattoo images stored in the tattoo training database.

20 Claims, 7 Drawing Sheets

(51) Int. Cl.
  *G06V 20/40* (2022.01)
  *G06F 18/211* (2023.01)
  *G06F 18/214* (2023.01)

(58) Field of Classification Search
  CPC ...... G06V 10/50; G06V 10/757; G06V 20/62; G06V 20/63; G06V 30/10; G06V 30/19173; G06V 40/172; G06F 18/211; G06F 18/214; G06F 18/217; G06F 18/22; G06F 18/2413; G06F 18/2148; G06F 16/583; G06F 16/5838; G06F 18/00; G06F 18/213; G06F 18/24133; G06N 3/08; G06N 3/045; G06N 3/082; G06N 3/084; G06N 20/00; G06N 5/046; G06N 3/04; G06N 3/044; G06N 7/01; G06T 2207/20081; G06T 2207/20084; G06T 7/11; G06T 7/70; G06T 7/73; G06T 7/90
  See application file for complete search history.

(56) References Cited

U.S. PATENT DOCUMENTS

| | | | | |
|---|---|---|---|---|
| 10,679,092 | B2* | 6/2020 | Hougen | G06V 10/457 |
| 10,846,552 | B1* | 11/2020 | Wu | G06V 10/454 |
| 11,048,917 | B2* | 6/2021 | Kang | G06N 20/00 |
| 2010/0009713 | A1* | 1/2010 | Freer | G06V 10/95 |
| | | | | 455/556.1 |
| 2014/0079321 | A1* | 3/2014 | Huynh-Thu | G06V 20/40 |
| | | | | 382/203 |
| 2014/0164413 | A1* | 6/2014 | Matsumoto | G06F 16/583 |
| | | | | 707/756 |
| 2016/0307057 | A1* | 10/2016 | Li | G06F 16/5838 |
| 2017/0323452 | A1* | 11/2017 | Chen | G06V 20/582 |
| 2018/0075603 | A1* | 3/2018 | Hougen | G06T 7/0002 |
| 2018/0150956 | A1* | 5/2018 | Kao | G06T 7/11 |
| 2018/0173988 | A1* | 6/2018 | Sharma | G06V 30/412 |
| 2018/0300540 | A1* | 10/2018 | Swisher | G06F 18/24133 |
| 2019/0012561 | A1* | 1/2019 | Hougen | G06V 10/457 |
| 2019/0057233 | A1* | 2/2019 | Scott | G06V 40/173 |
| 2019/0279045 | A1* | 9/2019 | Li | G06V 10/82 |
| 2019/0311210 | A1* | 10/2019 | Chatterjee | G06N 3/045 |
| 2019/0347497 | A1* | 11/2019 | Wang | G06T 7/62 |
| 2020/0022648 | A1* | 1/2020 | Danino | G01N 33/4972 |
| 2020/0134377 | A1* | 4/2020 | Attorre | G06V 10/82 |
| 2020/0272902 | A1* | 8/2020 | Feng | G06V 10/82 |
| 2020/0364888 | A1* | 11/2020 | Tsai | G06N 3/063 |
| 2020/0372268 | A1* | 11/2020 | Duan | G06F 18/217 |
| 2021/0064934 | A1* | 3/2021 | Swaminathan | G06N 20/00 |
| 2021/0117724 | A1* | 4/2021 | Taheri | G06V 30/274 |
| 2021/0279471 | A1* | 9/2021 | Yang | G06N 3/08 |
| 2022/0101025 | A1* | 3/2022 | Ueda | G06V 10/25 |
| 2022/0180490 | A1* | 6/2022 | Jo | G06N 3/08 |

OTHER PUBLICATIONS

Hrkac et al., "Deep Learning Architectures for Tattoo Detection and De-identification", 2016 First International Workshop on Sensing, Processing and Learning for Intelligent Machines (Spline). Jul. 6, 2016. pp. 1-5.

* cited by examiner

DEEP LEARNING TATTOO MATCH SYSTEM BASED

RELATED APPLICATION INFORMATION

This application claims priority to Provisional Application No. 62/984,850, filed on Mar. 4, 2020, incorporated herein by reference in its entirety.

BACKGROUND

Technical Field

The present invention relates to tattoo detection and, more particularly, to employing deep learning detection models to detect tattoos which can be used to identify individuals by their tattoos.

Description of the Related Art

Tattoos, as soft biometric characters, have been widely used by law-enforcement departments due to their popularity. Tattoo detection datasets need to be developed to aid law enforcement. Recently there has been a tremendous increase in the accuracy of object detection by employing deep convolutional neural networks (CNNs). This has made visual object detection an attractive possibility for domains ranging from surveillance to autonomous driving. However, speed is a key requirement in many applications, such as tattoo detection datasets, which fundamentally contends with demands on accuracy. Thus, while advances in object detection have relied on increasingly deeper architectures, such architectures are associated with an increase in computational expense at runtime.

SUMMARY

A computer-implemented method executed by at least one processor for detecting tattoos on a human body is presented. The method includes inputting a plurality of images into a tattoo detector, selecting one or more images of the plurality of images including tattoos, extracting, via a feature extractor, tattoo feature vectors from the tattoos found in the one or more images of the plurality of images including tattoos, applying a deep learning tattoo matching model to determine potential matches between the tattoo feature vectors and preexisting tattoo images stored in a tattoo training database, and generating a similarity score between the tattoo feature vectors and one or more of the preexisting tattoo images stored in the tattoo training database.

A system for detecting tattoos on a human body is also presented. The system includes a memory and a processor in communication with the memory, wherein the processor is configured to input a plurality of images into a tattoo detector, select one or more images of the plurality of images including tattoos, extract, via a feature extractor, tattoo feature vectors from the tattoos found in the one or more images of the plurality of images including tattoos, apply a deep learning tattoo matching model to determine potential matches between the tattoo feature vectors and preexisting tattoo images stored in a tattoo training database, and generate a similarity score between the tattoo feature vectors and one or more of the preexisting tattoo images stored in the tattoo training database.

A non-transitory computer-readable storage medium comprising a computer-readable program is presented for detecting tattoos on a human body, wherein the computer-readable program when executed on a computer causes the computer to perform the steps of inputting a plurality of images into a tattoo detector, selecting one or more images of the plurality of images including tattoos, extracting, via a feature extractor, tattoo feature vectors from the tattoos found in the one or more images of the plurality of images including tattoos, applying a deep learning tattoo matching model to determine potential matches between the tattoo feature vectors and preexisting tattoo images stored in a tattoo training database, and generating a similarity score between the tattoo feature vectors and one or more of the preexisting tattoo images stored in the tattoo training database.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
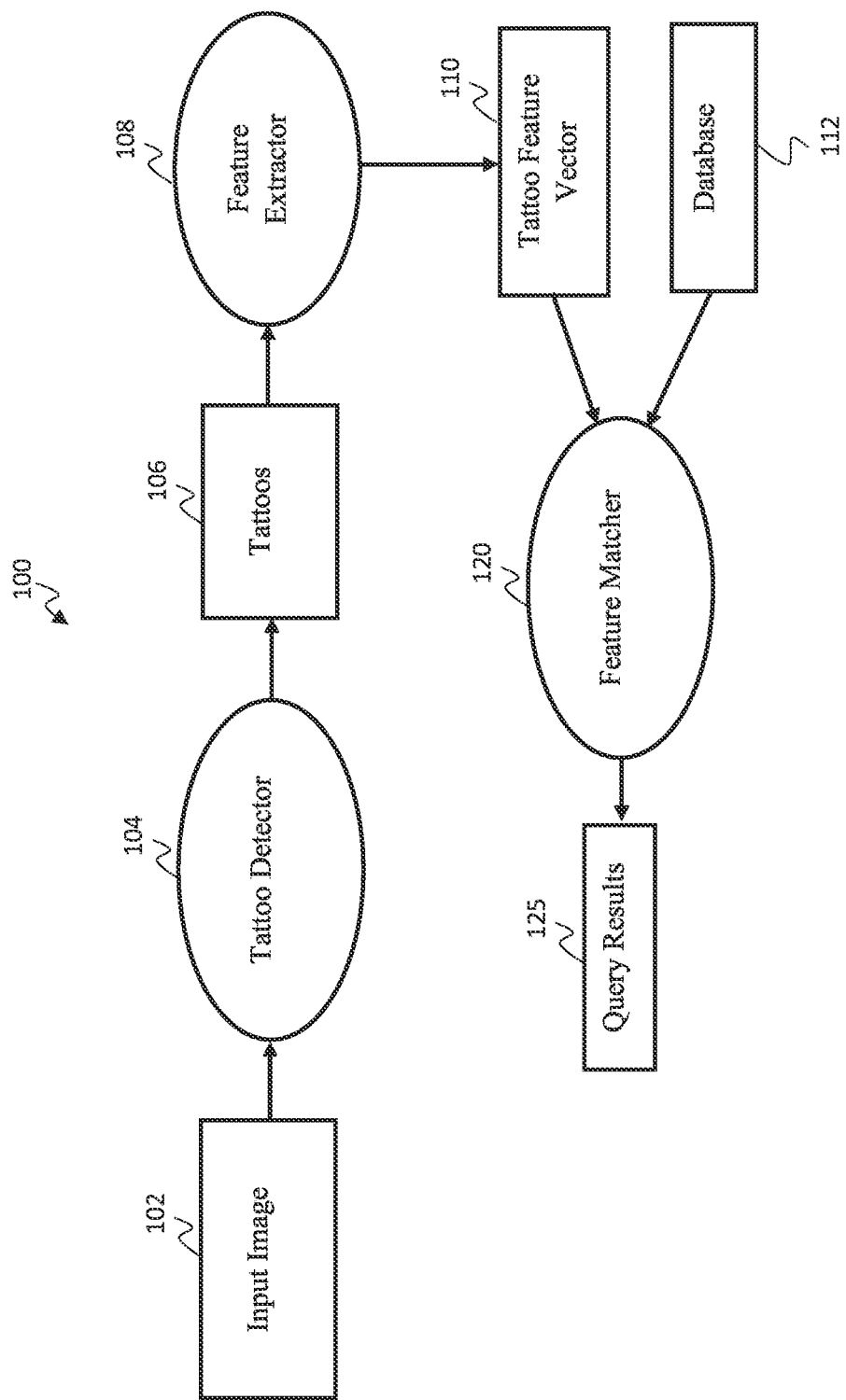
FIG. 1 is a block/flow diagram illustrating a tattoo search framework, in accordance with embodiments of the present invention.

The exemplary embodiments of the present invention employ deep learning networks for tattoo identification. Soft biometrics are physiological and behavioral characteristics that provide some identifying information about an individual. Color of eye, gender, ethnicity, skin color, height, weight, hair color, scar, birthmarks, and tattoos are examples of soft biometrics. In particular, person identification and retrieval systems based on tattoos have gained a lot of interest.

The exemplary embodiments of the present invention disclose systems and methods for employing deep learning models for tattoo detection employing neural networks. Regarding neural networks, neural networks use artificial neurons configured by simplifying functions of biological neurons, and the artificial neurons may be connected to each other through edges having connection weights. The connection weights, parameters of the neural network, are predetermined values of the edges, and may also be referred to as connection strengths. The neural network may perform a cognitive function or a learning process of a human brain through the artificial neurons. The artificial neurons may also be referred to as nodes.

A neural network may include a plurality of layers. For example, the neural network may include an input layer, a hidden layer, and an output layer. The input layer may receive an input to be used to perform training and transmit the input to the hidden layer, and the output layer may generate an output of the neural network based on signals received from nodes of the hidden layer. The hidden layer may be disposed between the input layer and the output layer. The hidden layer may change training data received from the input layer to an easily predictable value. Nodes included in the input layer and the hidden layer may be connected to each other through edges having connection weights, and nodes included in the hidden layer and the output layer may also be connected to each other through edges having connection weights. The input layer, the hidden layer, and the output layer may respectively include a plurality of nodes.

The neural network may include a plurality of hidden layers. A neural network including the plurality of hidden layers may be referred to as a deep neural network. Training the deep neural network may be referred to as deep learning. Nodes included in the hidden layers may be referred to as hidden nodes. The number of hidden layers provided in a deep neural network is not limited to any particular number.

The neural network may be trained through supervised learning. Supervised learning refers to a method of providing input data and output data corresponding thereto to a neural network, and updating connection weights of edges so that the output data corresponding to the input data may be output. For example, a model training apparatus may update connection weights of edges among artificial neurons through a delta rule and error back-propagation learning.

Error back-propagation learning refers to a method of estimating a loss with respect to input data provided through forward computation, and updating connection weights to reduce a loss in a process of propagating the estimated loss in a backward direction from an output layer toward a hidden layer and an input layer. Processing of the neural network may be performed in an order of the input layer, the hidden layer, and the output layer. However, in the error back-propagation learning, the connection weights may be updated in an order of the output layer, the hidden layer, and the input layer. Hereinafter, according to an exemplary embodiment, training a neural network refers to training parameters of the neural network. Further, a trained neural network refers to a neural network to which the trained parameters are applied.

Referring back to tattoos, tattoos are a unique form of art, which are more popular today than ever before. It is estimated that more than 100 million U.S. citizens have tattoos. Therefore, tattoos can be considered as soft biometric characters by law-enforcement departments. Tattoo detection, search, recognition and match have become emerging techniques similar to other biometric technologies such as fingerprint and facial recognition. The exemplary embodiments introduce methods and systems including both tattoo detection and tattoo matching by taking advantage of deep learning techniques.

Among techniques related to tattoos, tattoo detection is a fundamental technique for other techniques as a first step of tattoo matching to detect tattoos. While tattoo detection is similar to other object detection techniques, which have achieved a significant improvement using deep learning techniques, most tattoo datasets are not sufficient for detection training due to the lack of enough background information. It is observed that many tattoos only depict a single tattoo. To find tattoos with enough background, meaning with peoples' skin acting as a background, the exemplary embodiments use person key-points detection on existing tattoo datasets. The exemplary embodiments only consider tattoo images that include enough person key-points and then label the tattoos manually. The dataset developed includes nearly 21K images with different numbers of tattoos, up to 10 tattoos per image, and on average 1.95 tattoos per image.

With the dataset, the exemplary embodiments apply two deep learning models, R-50-FPN (feature pyramid network) and MobileNet-SSD (Single-Shot multibox Detection). The R-50-FPN model is based on Resnet and Faster RCNN (Region-based Convolutional Neural Networks), built on top of maskrcnn-benchmark, detectron, and PyTorch, and is the state-of-the-art solution for object detection. MobileNet-SSD is another object detection model, focusing on a lightweight solution.

The exemplary embodiments develop another dataset for tattoo matching. The tattoo match dataset includes, e.g., 772 classes and each class has, e.g., 70 images on average. In this dataset, the exemplary embodiments use tattoo videos to increase the number of tattoo classes and use sticker tattoos (or non-permanent tattoos) to make additional tattoo videos to produce a large number of variations. The match framework is based on deep ranking, but with the latest network.

Therefore, the exemplary embodiments develop a dataset for tattoo detection, and further develop a dataset for tattoo matching, which not only has a large number of classes but also covers different variations of single tattoos. The exemplary embodiments further build tattoo recognition based on the idea of deep ranking but with an advanced network.

Since the definition of tattoos is "a form of body modification," the exemplary methods consider the background of tattoos to be the human body or human skin. Therefore, what is needed is to find out whether captured images include people in tattoo datasets. To further have enough or sufficient background of people, the people in the captured images should have enough or sufficient or adequate key-points. In the dataset construction stage, the exemplary embodiments first use person key-points detection to detect persons or individuals in tattoo datasets. The images which include a number of person key-points are used for manual labeling.

In the dataset, the exemplary embodiments only use captured images which have at least three key-points with person confidence of more than 0.95. Among 360K images from the WebTattoo database, the exemplary embodiments identified 94K images including at least three key-points, and the exemplary methods maintained or utilized 21K such images as start-points.

However, it was observed that among the 21K images, many images are still not good candidates for object detection training. There are examples including a tattoo presenting a person where the key-points detector doesn't detect a real person, a tattoo design porotype instead of a tattoo on the skin, and images without tattoos. Such images need to be removed to create an accurate training database.

As noted, the exemplary embodiments use two models, R-50-FPN, and MobileNet-SSD. The R-50-FPN model is based on maskrcnn-benchmarks with pytorch v3.0. The MobileNet-SSD is based on SSD-Caffe and MobileNet. For the hardware, the exemplary embodiments can use a server with a CPU, Intel i9-9900k, which has 6 cores, up to 5.00 GHz, and a GPU, RTX 2080, which has 8 GB memory and 10.07 TFlops. The server has 32 GB memory. On top of the operating system is Ubuntu 16.04, and the training and inference were done in NVIDIA docker v2.03 with CUDA 10 and CUDNN v7.

Regarding the R-50-FPN model, the exemplary embodiments selected R-50-FPN as the heavy model for better accuracy. While R-101-FPN may achieve a little better accuracy, the speed is not suitable as an engine for a real-time system, and R-50-FPN can achieve 30+ frames per second (FPS) on a fast graphical processing unit (GPU). The exemplary embodiments can, in one instance, use 8 as the batch size to fit in the 8 GB GPU memory. Since the dataset has a single category and is much smaller than the COCO dataset, the exemplary embodiments reduce the training iterator from 180000 to 60000. The COCO dataset is a large-scale object detection, segmentation, and captioning dataset. The exemplary embodiments also reduce the learning rate to 0.001 for stable converge. The size input images are limited to 800×480 for better interference time.

Regarding MobileNet-SSD, MobileNet-SSD is considered a lightweight model in the instant case, especially for the production environment without GPUs and the inference throughput can achieve real-time even for CPUs.

A large dataset for tattoo matching is preferred. A large number of variations for each identity are used to learn the different potential features. Since existing tattoo datasets do not possess such data, the exemplary methods develop the dataset which includes multiple tattoo images for each tattoo class. The dataset has two types of data sources, that is, non-permanent tattoo videos and permanent tattoo videos. Non-permanent tattoos refer to, e.g., sticker tattoos that can temporarily stick to skin of a human body. Such tattoos are temporary because they can be easily removed upon washing. Permanent tattoos refer to, e.g., stick and poke tattoos, as well as machine tattoos.

The difference between stick and poke tattoos and machine tattoos is how the ink is inserted into the skin. Hand poke tattoos are powered by hand, using a sterilized tattoo needle attached to some sort of grip, dipped in ink, and pushed into the skin. The needle goes just as deep and the results are just as permanent. Meanwhile, machine tattoos use a small motor encased in each tattoo machine that moves the attached tattoo needles up and down in a smooth, almost cyclical pattern. The machine speeds up the process dramatically.

Therefore, stick-and-poke tattoos are a form of non-electric tattooing, that is, there is no tattoo machine used. Instead, ink is applied to the skin by hand by attaching a needle to a rod-like contraption, much like a pencil and thread to create an analog tattoo machine. The art of stick and poke tattooing is the administration of ink into the skin, with the result being the creation of a permanent tattoo, without the use or aid of any electricity. This practice can also be known under many other names. Examples include hand poke tattoo, hand tattoo, machine-free tattoo and do-it-yourself (DIY) tattoo. As opposed to the use of a machine, the tattoo is created with the use of a single sterile tattoo needle, which can be attached to a stick. This needle is then repeatedly poked into the skin to create dots and eventually, a tattoo design.

The first type of data source is from non-permanent tattoos. In the exemplary methods, non-permanent tattoo images are obtained and are sticked or attached or placed onto skin of one or more persons. Since this type of data source is well controlled, the exemplary methods can decide the environment and length of videos. In general, the exemplary methods take a video of more than 20 seconds with different angles of each non-permanent tattoo. Then for every four frames, the exemplary methods keep one in the dataset, and therefore the exemplary methods have more than 100 frames for each non-permanent tattoo with 30 FPS of the video.

Another data source is the use of either mobile phones or cameras to record videos from people with permanent tattoos. Compared to non-permanent tattoo videos, the permanent tattoo videos include more complex tattoos. However, the lengths of the permanent tattoo videos can be very short (compared to the videos of the non-permanent tattoos) so as to have a smaller number of copies of a single tattoo. The quality of tattoo images can also be worse due to inadequate light conditions and movement of the individual. The exemplary methods consider non-permanent tattoo videos and permanent tattoo videos to complement each other and both are important to contribute to the learning process of tattoo matching. In other words the training database includes two training datasets. The first training dataset including non-permanent tattoo images and the second training dataset including permanent tattoo images.

From the raw dataset, which includes a set of videos and each video presents a tattoo or multiple tattoos, the exemplary methods generate a tattoo match dataset as follows:

First, each tattoo class in the videos is labeled. In each video, the exemplary methods select tattoos and assign one unique identifier (id) to each tattoo class. Then the exemplary methods label the locations of tattoos in different frames for each tattoo class. In other words, one tattoo class has multiple variations (or versions) since the tattoo class was recorded in multiple frames in a video. The exemplary methods can skip this step for non-permanent tattoo videos since each non-permanent tattoo video has only one non-permanent tattoo class and the exemplary methods are able to detect the non-permanent tattoo location using the tattoo detector with high accuracy.

Next, for each tattoo class, the exemplary methods extract frames from its video. Since adjacent frames are very similar, the exemplary methods only keep some frames depending on the overall number of frames of the tattoo class. For example, the exemplary methods only keep one per four frames for non-permanent tattoo videos, while the exemplary methods may keep one per two frames for some permanent tattoo videos. Based on the location information, the exemplary methods crop the image of every variation of each tattoo class from frames with 0.5× more on both width and height of the size. Thus, after this step, for each tattoo class, the exemplary methods have a set of images and each image includes one variation of the tattoo class.

Finally, the exemplary methods apply a tattoo detector on output images of the previous step to generate tattoo images, and each tattoo image presents the bounding box area after the detecting of the tattoo. As a result, the exemplary methods have a set of tattoo images for each tattoo class, which is used for tattoo match training.

In one non-limiting example, 159 non-permanent tattoos were obtained, non-permanent tattoos being, e.g., sticker tattoos. Since one frame is kept for every four frames for non-permanent tattoo videos, each non-permanent tattoo has 130 to 228, or on average 177 frames to be processed. Then the exemplary methods apply the tattoo detector on these frames to crop the tattoos from these frames. The tattoo detector is able to find exactly one tattoo for 83.1% frames with a confidence threshold of 0.7 but unable to find any tattoos for 12.6% frames. The exemplary methods verify these 12.6% frames and observe that a non-permanent tattoo image can be at an undesirable angle and that a sticker picture may be different, for example, too simple, compared to a machine generated or permanent tattoo. While the detector works with these sticker tattoos (or non-permanent tattoos) with a lower threshold, the exemplary methods choose to ignore these frames without tattoos since the exemplary methods prefer high-quality training data for tattoo matching purposes. For frames with multiple tattoos, the exemplary methods use the largest tattoo to crop the frame. After the process, the exemplary methods acquire on average 147 variations for each non-permanent tattoo.

Besides the 159 non-permanent tattoos obtained in a non-limiting example, the exemplary methods have, in one instance, 654 tattoo classes from videos. However, 41 classes can be ignored since the video clip is too short or detection results do not return enough tattoos. The exemplary embodiments have on average 100 frames per tattoo classes. Since the exemplary embodiments choose to keep every other frame for each tattoo classes, around 50 variations can be had for each tattoo class. Overall, the exemplary methods have a dataset that includes, e.g., in one non-limiting instance, 772 tattoo classes and on average each tattoo class has about 70 variations.

FIG. 1 is a block/flow diagram 100 illustrating a tattoo search framework, in accordance with embodiments of the present invention.

At block 104, a tattoo detector is first applied on the input image 102 to find all tattoos 106 in the input image 104. Then in block 108, for each detected tattoo 106, a feature extractor 108 extracts feature vectors using a deep learning tattoo match model. Next extracted feature vector 110 is computed to determine similarity with preexisting or pre-stored tattoos stored in the database 112. A feature matcher 120 is employed to determine any similarity between the tattoo feature vectors 110 and preexisting tattoo images in the database 112. A similarity score is computed to sort the query results 125, which include the matched tattoos and original or preexisting images.

Figure 2:
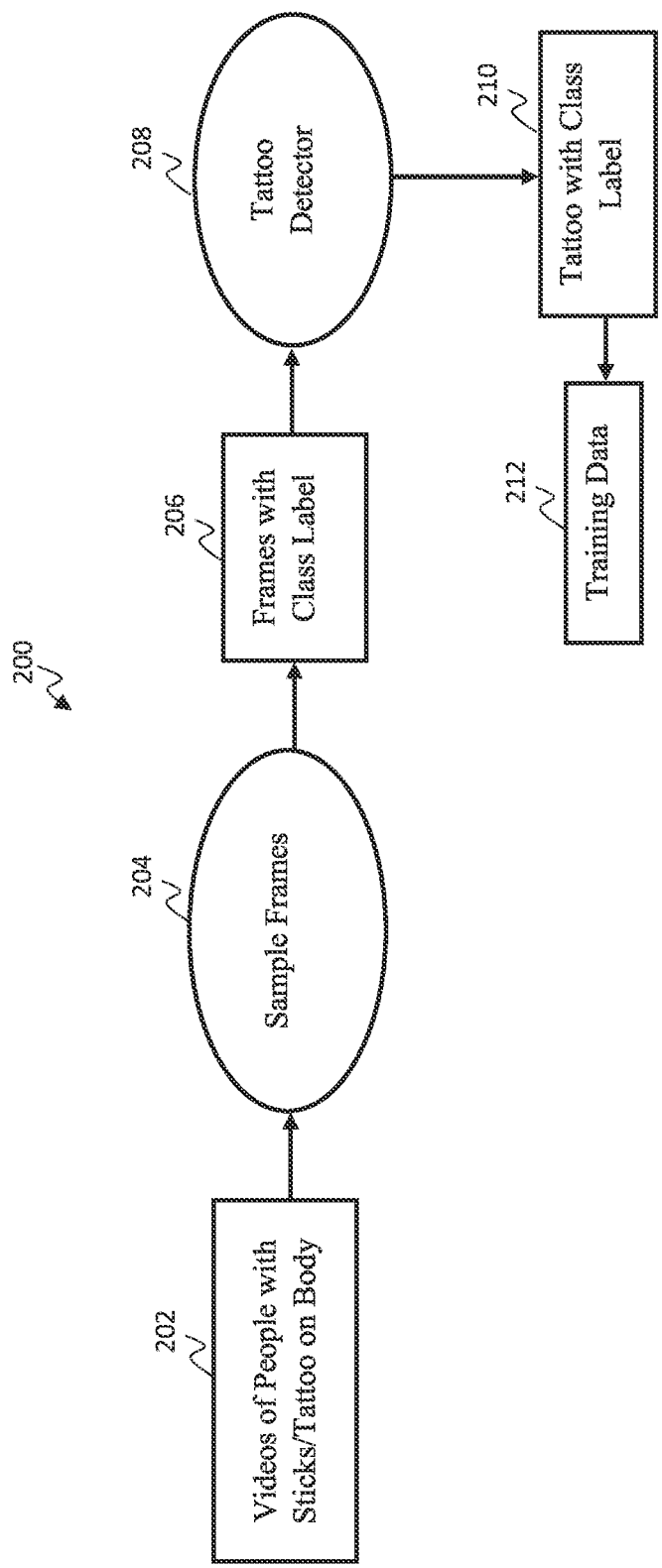
FIG. 2 is a block/flow diagram illustrating extracting a tattoo training dataset from non-permanent tattoos, in accordance with embodiments of the present invention.

FIG. 2 is a block/flow diagram 200 illustrating extracting a tattoo training dataset from non-permanent tattoos, in accordance with embodiments of the present invention.

The training data for matching purposes needs images which include multiple image versions of a single tattoo. Each tattoo is considered as a class. The exemplary embodiments have two sources of the training data. The first type of data source is from non-permanent tattoos.

In the exemplary methods, as noted above, non-permanent tattoo images are obtained and are sticked onto skin of a person or persons. Since this type of data source is well controlled, the exemplary methods are able to decide the environment and length of non-permanent tattoo videos. In general, the exemplary methods take a video of more than 20 seconds with different angles of each non-permanent tattoo. Then for every four frames, the exemplary methods keep one in the dataset, and therefore the exemplary methods have more than 100 frames for each non-permanent tattoo with 30 FPS of the video.

Another data source is the use of either mobile phones or cameras to record videos from people with permanent tattoos. Compared to non-permanent tattoo videos, the permanent tattoo videos include more complex tattoos. However, the lengths of the permanent tattoo videos can be very short (compared to the videos of the non-permanent tattoos) so as to have a smaller number of copies of a single tattoo. The quality of tattoo images can also be worse due to bad light conditions and movement of the individual. The exemplary methods consider either non-permanent tattoo videos or permanent tattoo videos to complement each other and both are important to contribute to the learning process of tattoo matching. In other words, the training database includes two training datasets. The first training dataset including non-permanent tattoo images and the second training dataset including permanent tattoo images.

For each tattoo instance, the exemplary methods extract sample frames 204 from its respective video 202. Since adjacent frames are very similar, the exemplary methods only keep some of the frames depending on the overall number of frames of the tattoo instance. For example, the exemplary methods only keep one per four frames for non-permanent tattoo videos, while the exemplary methods may keep one per two frames for permanent tattoo videos. Based on the location information, the exemplary methods crop the image of every variation of each tattoo instance from frames with 0.5× more on both width and height of the size. Thus, after this step, for each tattoo instance, the exemplary methods include a set of images and each image includes one variation of the tattoo instance.

A tattoo detector 208 is applied on the output images 206 (frames with class labels) to generate tattoo images 210 (tattoos with class labels), and each tattoo image presents the bounding box area after detecting. Thus, a set of tattoo images 212 is obtained for each tattoo instance, which is used for the tattoo match training, e.g., used as training data 212.

Figure 3:
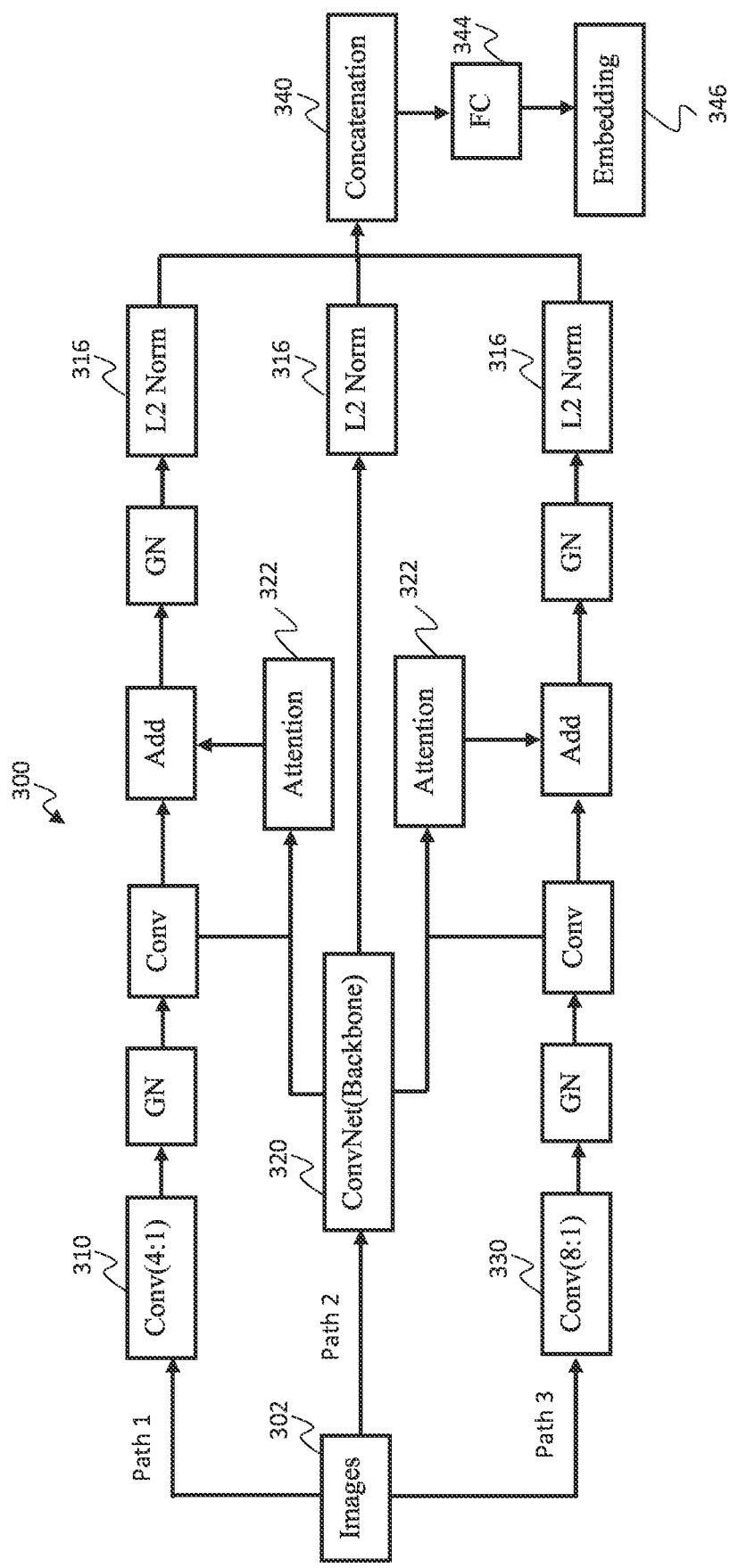
FIG. 3 is a block/flow diagram illustrating a deep learning network for tattoo matching, in accordance with embodiments of the present invention.

FIG. 3 is a block/flow diagram 300 illustrating a deep learning network for tattoo matching, in accordance with embodiments of the present invention.

The tattoo match component is developed based on the idea of deep ranking, which shows great benefits for fine-grain image similarity. The architecture 300 is similar to deep ranking and has three paths for each input image 302. Among three paths, the exemplary methods use Conv (4:1) (310) and Cony (8:1) (330) branches to learn low-level visual features such as edges, shadow, etc. The path of ConvNet has a Backbone of DenseNet201 (320), and attention components 322 are added to align high-level concepts with low-level visual features. L2 norm component 316 is applied to each path and concatenation 340 is enabled. After FC layer 344, embedding 346 is performed and the exemplary methods have a vector of 1024 floats as the feature of each image. Euclidean distance is used to compute the similarity between two feature vectors. The exemplary methods map the similarity score to a confidence score which is between 0 and 1, and the higher confidence score indicates more similarity.

Figure 4:
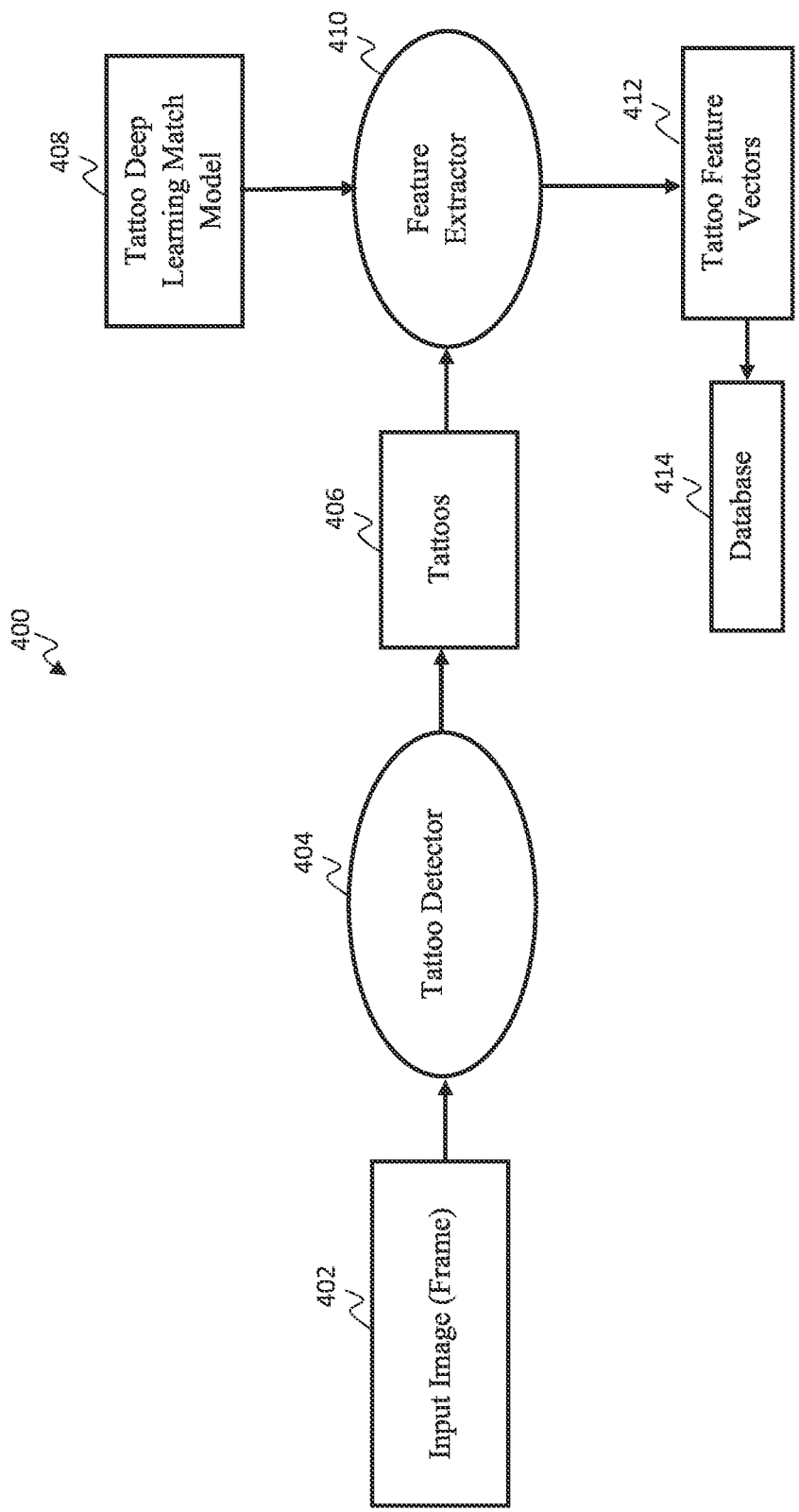
FIG. 4 is a block/flow diagram illustrating extracting a tattoo and its features from a video frame, in accordance with embodiments of the present invention.

FIG. 4 is a block/flow diagram 400 illustrating extracting a tattoo and its features from a video frame, in accordance with embodiments of the present invention.

A video stream includes a series of frames 402 (or images). The system extracts tattoo features used to perform subsequent matches.

A deep learning model is used to perform tattoo detection by a tattoo detector 404. From an image 402 of a video stream, the tattoo detector 404 detects the location of each tattoo 406 identified in the image 402. The output of the tattoo detector 404 is thus a set of tattoo images 406. Deep learning 408 (DL tattoo matching model 408) is applied to each tattoo image 406 to extract its features via a feature extractor 410. The output is a vector of floats 412. The feature vector 412 is used to compute similarity among different tattoos. Each tattoo, its feature, and its original frame information are stored in a database 414 to be used for subsequent searching.

In summary, the exemplary embodiments of the present invention detect tattoos from a video stream and allow users to search for a tattoo to find similar tattoos in a database. The exemplary embodiments include a large dataset for tattoo match training, use videos of people with non-permanent tattoos (e.g., sticker tattoos) and videos of people with permanent tattoos (e.g., machine tattoos and stick and poke tattoos), and apply a tattoo detector on images to extract tattoos with labels. The exemplary embodiments include a tattoo classifier to extract the feature for each tattoo, where each tattoo image is converted to a vector of floats. The exemplary embodiments further include a tattoo search mechanism. The detected tattoos are stored in a database. Therefore, the image to be searched will first be applied using tattoo detection to find all tattoos in sample images, each detected tattoo is converted to a feature vector, the feature vector is computed with feature vectors in database to get the similarity, and the result is sorted with similarity.

Moreover, the exemplary embodiments of the present invention build a tattoo dataset for tattoo match training. The exemplary embodiments further find similarities between detected tattoos and preexisting or prestored tattoos. The exemplary embodiments introduce methods and systems for detecting tattoos from frames or images of a video stream, extract features from the detected tattoos, and compute a similarity between tattoos. The dataset includes, in one non-limiting example, about 800 classes with approximately 70 images per class to train a classifier to extract features from the detected tattoos. The exemplary embodiments use one feature vector of 1024 floats to present each tattoo, with cosine similarity to compute a match score. The tattoo match DL framework can be based on deep ranking.

Figure 5:
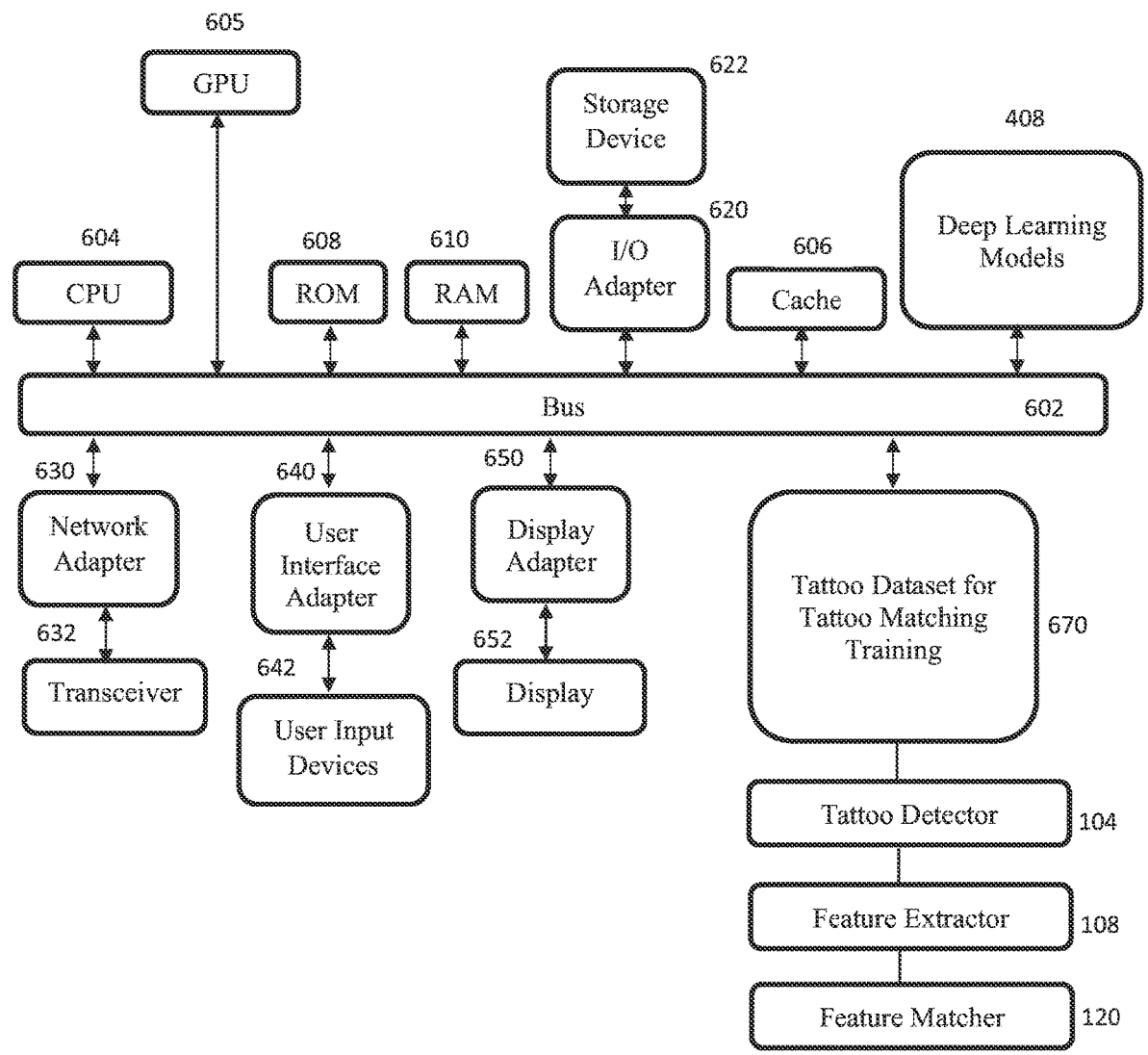
FIG. 5 is an exemplary processing system for tattoo detection, in accordance with embodiments of the present invention.

FIG. 5 is an exemplary processing system for tattoo detection, in accordance with embodiments of the present invention.

The processing system includes at least one processor (CPU) 604 operatively coupled to other components via a system bus 602. A GPU 605, a cache 606, a Read Only Memory (ROM) 608, a Random Access Memory (RAM) 610, an input/output (I/O) adapter 620, a network adapter 630, a user interface adapter 640, and a display adapter 650, are operatively coupled to the system bus 602. Additionally, deep learning models 408 can be employed for tattoo detection. The tattoo dataset for tattoo matching training 670 can be employed by using a tattoo detector 104, a feature extractor 108, and a feature matcher 120.

A storage device 622 is operatively coupled to system bus 602 by the I/O adapter 620. The storage device 622 can be any of a disk storage device (e.g., a magnetic or optical disk storage device), a solid-state magnetic device, and so forth.

A transceiver 632 is operatively coupled to system bus 602 by network adapter 630.

User input devices 642 are operatively coupled to system bus 602 by user interface adapter 640. The user input devices 642 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 642 can be the same type of user input device or different types of user input devices. The user input devices 642 are used to input and output information to and from the processing system.

A display device 652 is operatively coupled to system bus 602 by display adapter 650.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 6:
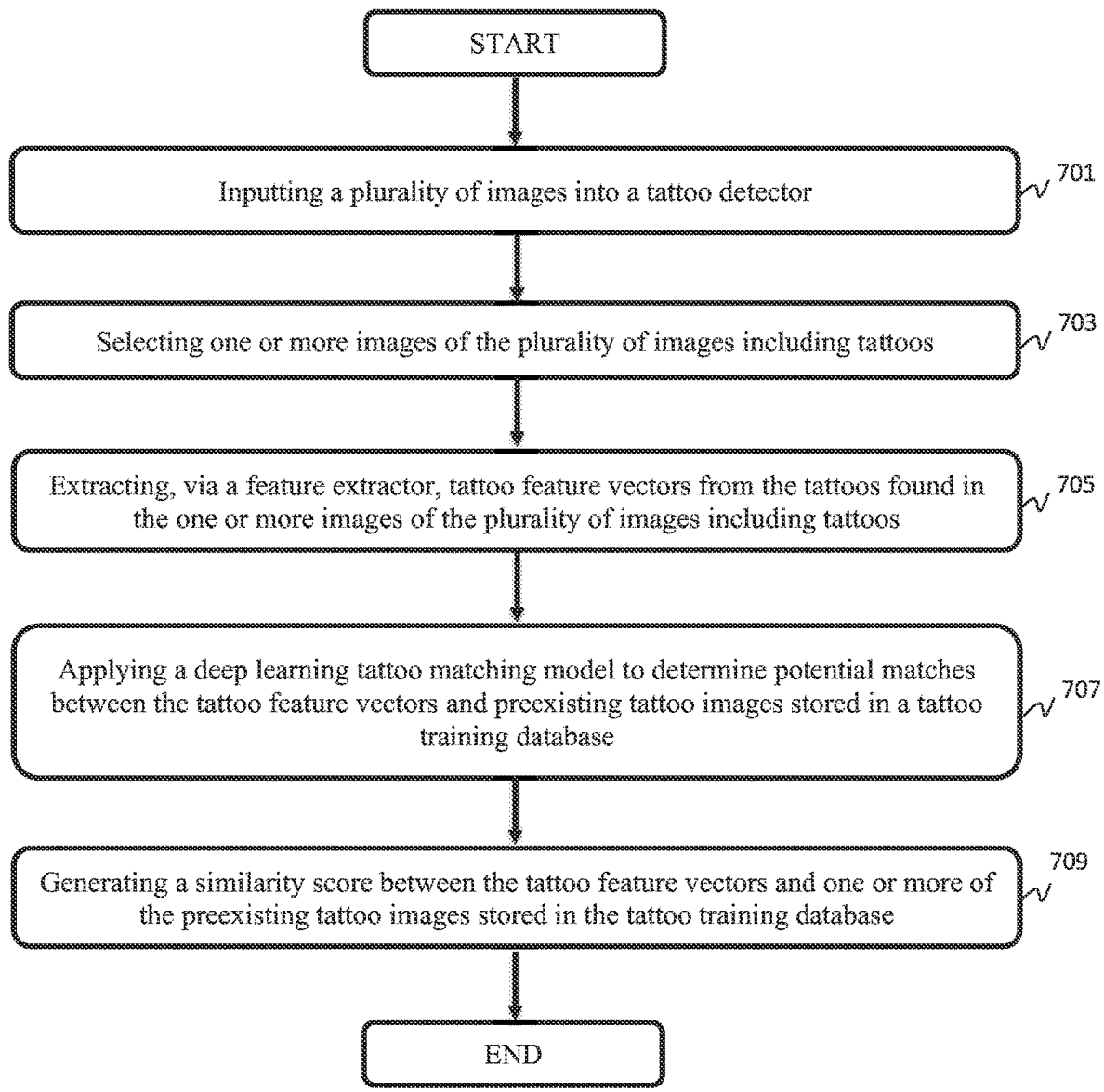
FIG. 6 is a block/flow diagram of a method for tattoo detection, in accordance with embodiments of the present invention.

FIG. 6 is a block/flow diagram of a method for tattoo detection, in accordance with embodiments of the present invention.

At block 701, input a plurality of images into a tattoo detector.

At block 703, select one or more images of the plurality of images including tattoos.

At block 705, extract, via a feature extractor, tattoo feature vectors from the tattoos found in the one or more images of the plurality of images including tattoos.

At block 707, apply a deep learning tattoo matching model to determine potential matches between the tattoo feature vectors and preexisting tattoo images stored in a tattoo training database.

At block 709, generate a similarity score between the tattoo feature vectors and one or more of the preexisting tattoo images stored in the tattoo training database.

Figure 7:
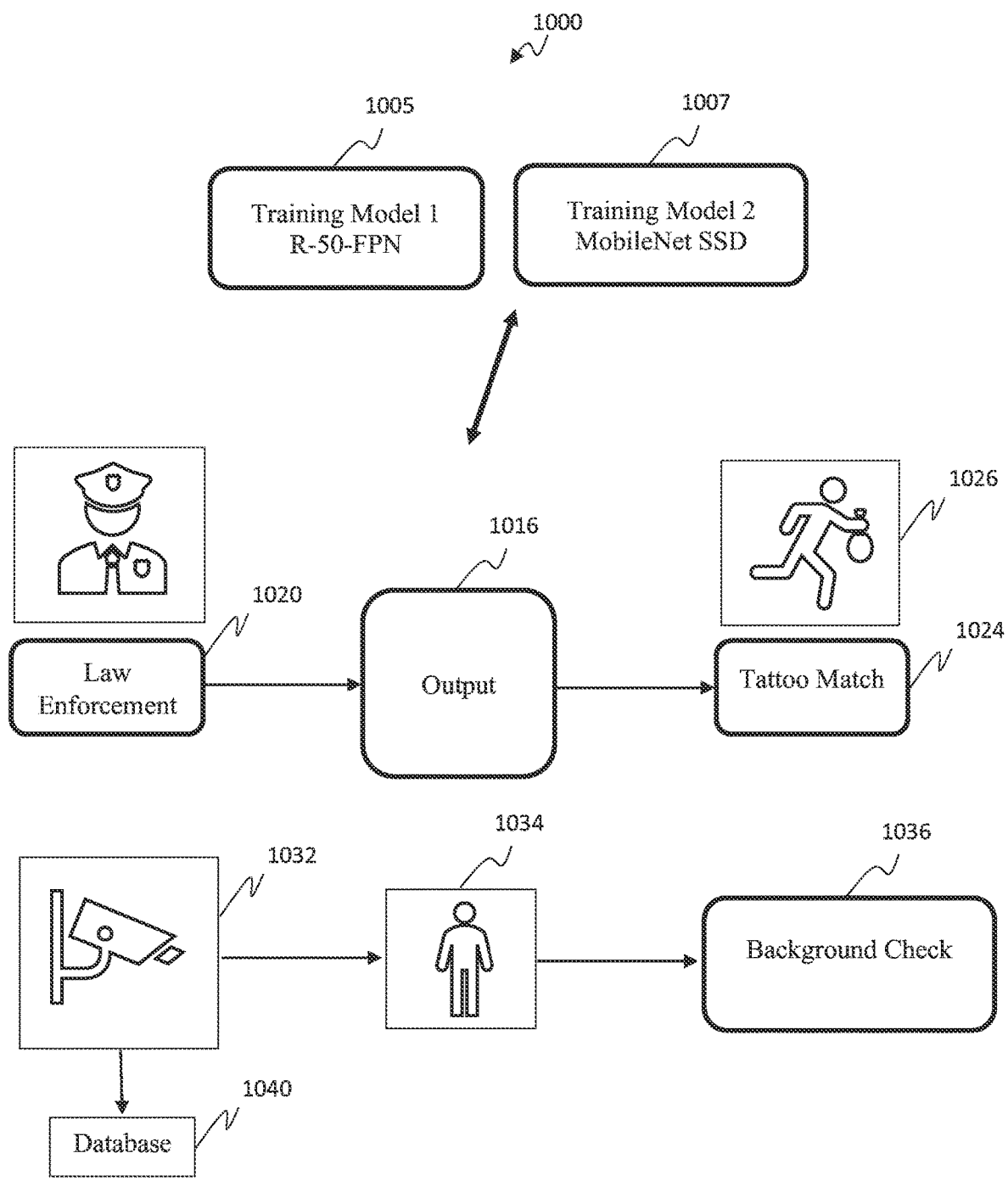
FIG. 7 is a block/flow diagram of practical applications for the tattoo detection, employing the two deep learning models, in accordance with embodiments of the present invention.

FIG. 7 is a block/flow diagram of practical applications for the tattoo detection, employing the two deep learning models, in accordance with embodiments of the present invention.

The exemplary embodiments of the present invention can be implemented in several practical applications. In one example, the system 1000 includes two deep learning training models 1005, 1007. In one example, law enforcement 1020, e.g., a police officer, may need tattoo information as part of an identification of a potential suspect 1034. The tattoo system with training models 1005 and 1007 can automatically detect tattoos from the pictures taken of the suspect 1034 and store these tattoos in a database 1040 associated with the suspect's profile. In other words, the law enforcement 1020 doesn't have to manually mark each tattoo of the suspect 1034 and then save it to the database 1040. Instead, the pictures of tattoos are automatically saved as they are detected by capturing devices 1032.

In another example, law enforcement 1020, e.g., a police officer, may want to browse through the database including the output 1016. The law enforcement personnel 1020 can browse through the labeled tattoo images 1016 to determine whether there is a tattoo match 1024 with a potential suspect 1026. The law enforcement personnel 1020 may have apprehended the potential suspect 1026 that got away. However, the law enforcement personnel 1020 may have noticed a unique or distinctive tattoo on the suspect's arm that is a known gang related tattoo. The law enforcement personnel 1020 can browse the database 1040 to find similar tattoos that match the tattoo he/she has seen on the potential suspect 1026. Of course, if a snapshot of the potential suspect 1026 (obtained from cameras in the vicinity of the potential suspect 1026) was captured, such snapshot may reveal a distinctive tattoo.

In yet another example, a camera 1032 can detect an individual 1034 with a tattoo on his entire leg. This can be considered a very unique or distinctive tattoo by a user evaluating the camera frames. The user can perform, e.g., a background check 1036 on the individual 1034 and determine whether or not the individual 1034 has a criminal history. If the individual 1034 does not have a criminal history, then a tattoo obscuring component of the camera 1032 obscures the tattoo on the tattoo image generated. If the individual 1034 does have a criminal history, then the tattoo obscuring component of the camera 1032 does not obscure the tattoo on the tattoo image generated, which can be evaluated by law enforcement 1020. Of course, one skilled in the art can contemplate a plurality of other different practical applications for using the tattoo image database 1040.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method executed by at least one processor for detecting tattoos on a human body, the method comprising:
   inputting a plurality of images into a tattoo detector;
   selecting one or more images of the plurality of images including tattoos on a human body;
   extracting, via a feature extractor, tattoo feature vectors from the tattoos found in the one or more images of the plurality of images including tattoos on the human body;
   applying a deep learning tattoo matching model to determine potential matches between the tattoo feature vectors and preexisting tattoo images stored in a tattoo training database, the deep learning tattoo matching model having three paths for each image of the plurality of images input into the tattoo detector, the first path including a Conv(4:1) branch, the second path including a ConvNet branch with two attention mechanisms, and the third path including a Conv(8:1) branch, where each path provides for a single L2 Norm directly before concatenation is performed; and
   generating a similarity score between the tattoo feature vectors and one or more of the preexisting tattoo images on the human body stored in the tattoo training database to identity a person by a soft biometric trait.

2. The method of claim 1, wherein the tattoo training database employs a combination of two training datasets.

3. The method of claim 2, wherein the first training dataset includes non-permanent tattoos detected from multiple frames of a video stream.

4. The method of claim 3, wherein each non-permanent tattoo image in the first training dataset has multiple image versions, with each image version captured at a different angle.

5. The method of claim 4, wherein the second training dataset includes permanent tattoos detected from video capturing devices.

6. The method of claim 5, wherein an identifier is assigned to each non-permanent tattoo instance and each permanent tattoo instance.

7. The method of claim 5, wherein locations of each non-permanent tattoo instance and each permanent tattoo instance are labeled in different frames of the video stream.

8. A system for detecting tattoos on a human body, the system comprising:
   a memory; and
   a processor in communication with the memory, wherein the processor runs program code to:
      input a plurality of images into a tattoo detector;
      select one or more images of the plurality of images including tattoos on a human body;
      extract, via a feature extractor, tattoo feature vectors from the tattoos found in the one or more images of the plurality of images including tattoos on the human body;
      apply a deep learning tattoo matching model to determine potential matches between the tattoo feature vectors and preexisting tattoo images stored in a tattoo training database, the deep learning tattoo matching model having three path for each image of the plurality of images input into the tattoo detector, the first path including a Conv(4:1) branch, the second path including a ConvNet branch with two attention mechanisms, and the third path including a Conv(8:1) branch, where each path provides for a single L2 Norm directly before concatenation is performed; and
      generate a similarity score between the tattoo feature vectors and one or more of the preexisting tattoo images on the human body stored in the tattoo training database to identify a person by a soft biometric trait.

9. The system of claim 8, wherein the tattoo training database employs a combination of two training datasets.

10. The system of claim 9, wherein the first training dataset includes non-permanent tattoos detected from multiple frames of a video stream.

11. The system of claim 10, wherein each non-permanent tattoo image in the first training dataset has multiple image versions, with each image version captured at a different angle.

12. The system of claim 11, wherein the second training dataset includes permanent tattoos detected from video capturing devices.

13. The system of claim 12, wherein an identifier is assigned to each non-permanent tattoo instance and each permanent tattoo instance.

14. The system of claim 12, wherein locations of each non-permanent tattoo instance and each permanent tattoo instance are labeled in different frames of the video stream.

15. A non-transitory computer-readable storage medium comprising a computer-readable program for detecting tattoos on a human body, wherein the computer-readable program when executed on a computer causes the computer to perform the steps of:
   inputting a plurality of images into a tattoo detector;
   selecting one or more images of the plurality of images including tattoos on a human body;
   extracting, via a feature extractor, tattoo feature vectors from the tattoos found in the one or more images of the plurality of images including tattoos on the human body;
   applying a deep learning tattoo matching model to determine potential matches between the tattoo feature vectors and preexisting tattoo images stored in a tattoo training database, the deep earning tattoo matching model having three paths for each image of the plurality of images input into the tattoo detector, the first path including a Conv(4:1) branch, the second path including a ConvNet branch with two attention mechanisms, and the third path including a Conv(8:1) branch, where each path provides for a single L2 Norm directly before concatenation is performed; and
   generating a similarity score between the tattoo feature vectors and one or more of the preexisting tattoo images on the human body stored in the tattoo training database to identify a person by a soft biometric trait.

16. The non-transitory computer-readable storage medium of claim 15, wherein the tattoo training database employs a combination of two training datasets.

17. The non-transitory computer-readable storage medium of claim 16, wherein the first training dataset includes non-permanent tattoos detected from multiple frames of a video stream.

18. The non-transitory computer-readable storage medium of claim 17, wherein each non-permanent tattoo image in the first training dataset has multiple image versions, with each image version captured at a different angle.

19. The non-transitory computer-readable storage medium of claim 18, wherein the second training dataset includes permanent tattoos detected from video capturing devices.

20. The non-transitory computer-readable storage medium of claim 19, wherein an identifier is assigned to each non-permanent tattoo instance and each permanent tattoo instance.

* * * * *